Feb. 17, 1959  C. RIZZUTO  2,873,820
BABY CARRIAGE BRAKE MECHANISM
Filed Sept. 12, 1956
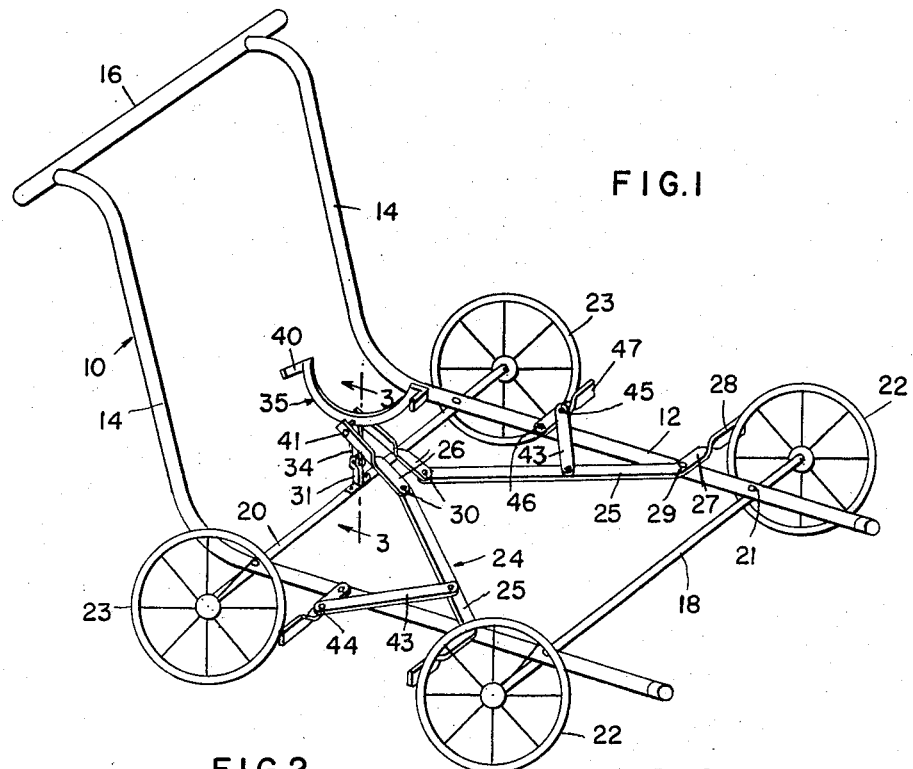
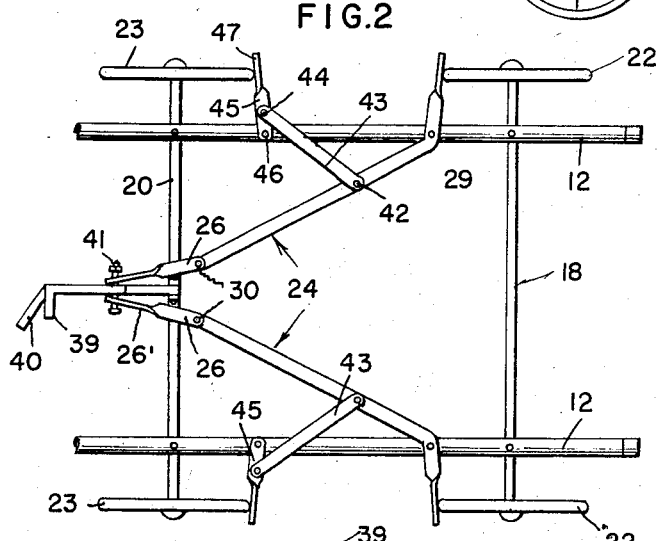
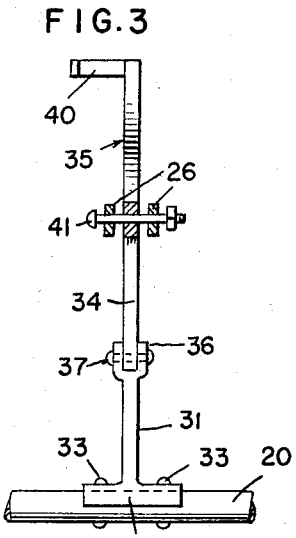
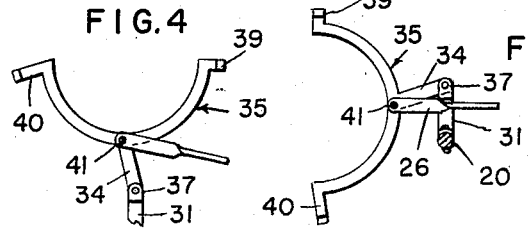
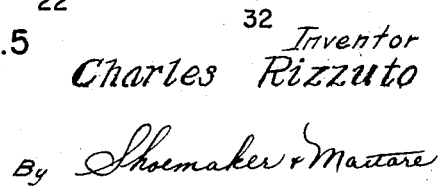
Inventor
Charles Rizzuto
By Shoemaker & Mattare
ATTYS

United States Patent Office 2,873,820
Patented Feb. 17, 1959

2,873,820

BABY CARRIAGE BRAKE MECHANISM

Charles Rizzuto, Brooklyn, N. Y., assignor to Anthony Rizzuto, Brooklyn, N. Y.

Application September 12, 1956, Serial No. 609,452

4 Claims. (Cl. 188—20)

This invention relates generally to brake mechanisms and is directed particularly to improved 4-wheel brake mechanism for use on wheeled vehicles such as baby carriages and the like.

Brake structures for baby carriages conventionally rely for their effectiveness upon the bending or flexing of resilient bar members mounted upon the carriage frame or upon springs acting against pivoted brake shoe carrying elements to move the brake shoes into frictional contact with the treads or tires of the carriage wheels.

Where resilient bar members are employed, the same usually are mounted to extend across the width of the carriage frame and have outer end portions which are designed to function as brake shoes and a pivoted lever is provided which is connected with the resilient bar so that when the lever is forced in one direction by the application of the foot thereto, the bar is bowed or bent to bring the outer ends against the wheel treads. Upon release of the foot actuated lever the bowed bar, due to its inherent resiliency, returns ot its straight condition to disengage the shoes from the wheels.

Where separate springs are employed, such springs are, of course, placed under tension when the foot lever is actuated to swing pivoted brake shoe carrying elements into frictional engagement with the wheel treads.

These prior constructions must provide some means for locking the foot lever, to hold the brakes applied and if such locking means slips then the brakes will be accidentally released. Also with the use of both the flexed or sprung bars and with the springs, these elements tend to lose their resiliency so that in time the effective application of the brakes is not obtained when the foot lever is actuated.

In view of the foregoing, a particular object of the present invention is to provide a new 4-wheel brake mechanism wherein the construction is such as to effectively hold the brakes applied without the employment of springs or bent or bowed spring bars.

Another object of the invention is to provide a new 4-wheel brake mechanism for baby carriages and the like wherein the construction is such as to effectively maintain the brakes applied by a pivoted foot-operated lever which is forced to an over-center position when actuated to apply the brakes to straighten out toggles and lock them into the straightened condition whereby to hold wheel tread engaging shoes, which are operatively connected with the toggles, in wheel tread engaging position.

Other and more specific objects of the invention will become apparent as the description of the same proceeds and the invention will be best understood from a consideration of the following detailed description taken in connection with the accompanying drawing forming part of the specification, with the understanding, however, that the invention is not confined to a strict conformity with the showing of the drawing but may be changed or modified so long as such changes or modifications mark no material departure from the salient features of the invention as expressed in the appended claims.

In the drawing:

Fig. 1 is a view in perspective of a carriage frame with axles secured thereto and wheels on the axles and showing the present improved braking mechanism mounted on the frame and in brake released condition;

Fig. 2 is a view in top plan of the mechanism with portions of the side members of the frame, showing the brakes applied;

Fig. 3 is a sectional view taken substantially on the line 3—3 of Fig. 1 transversely of the short links of the toggles and looking rearwardly.

Fig. 4 is a detail view illustrating the upright position of the foot lever, which position the lever assumes when the brakes are released;

Fig. 5 is a view corresponding to Fig. 4, but showing the foot lever in the down-swung position with the crank in the over-center position where the brake shoes are locked.

Referring now more particularly to the drawing, numeral 10 generally designates a conventional baby carriage frame which is here shown as comprising the straight parallel side rails 12 which at their rear ends merge with the upwardly and rearwardly extending handle bar posts 14 which at their top ends are connected by the transverse handle bar 16.

The numerals 18 and 20 designate respectively front and rear axles which extend transversely of the frame side rails 12 to which they are secured in a suitable manner as, for example, by means of rivets 21. These axles project beyond the outer sides of the rails 21 and carry the front and rear wheels 22 and 23, respectively.

In accordance with the present invention there are provided two relatively long toggles each of which is generally designated 24. These toggles comprise forward long links 25 and short rear links 26. The toggles are positioned to extend in rearwardly convergent relation as shown and the long links 25 have forward end portions which are bent to extend at an obtuse angle, which portions comprise brake arms 27 each of which terminates in a wheel tire or tread engaging shoe 28. At the angle connecting the brake arms with the long links 25 a pivot 29 secures the arm and link to a side rail 12 at a position adjacent to a front wheel 22 where the brake shoe extends across and in close proximity to the rear side of the adjacent front wheel.

The rear ends of the links 25 are pivotally attached to forward ends of the short links 26 as indicated at 30. These short links, where they may be formed of flat bar metal, are torsionally twisted so that the rear end portions have their wide faces disposed in vertical planes as indicated at 26', to facilitate their pivotal attachment to a foot lever operated crank in the manner about to be described.

Disposed upon the longitudinal center of the frame at the rear portion thereof is an upstanding crank supporting post 31 which is here shown as being mounted upon the rear axle 20 and to facilitate this mounting the lower end of the post is joined to a transversely arcuate plate 32 which straddles the axle 20 and is bolted or riveted thereto as indicated at 33, particular reference being had to Fig. 3.

While the post 31 is here illustrated and described as being mounted on the rear axle it is, of course, to be understood that use may be made, if desired, of a cross bar secured to the side rails 12 to support the post.

Mounted to swing upon the upper end of the post 31 on an axis extending transversely of the frame is a crank arm which is designated 34 and which is rigidly secured at one end to a foot lever 35. The crank arm is here shown as having one end positioned between a pair of ears 36 which form elements of a bifurcation of the upper end of the post 31 and a pivot pin 37 extends through the ears and through the arm 34 to couple the parts together. This arm 34 is designed to swing, in the operation of the brake mechanism, downwardly and rearwardly and, due to the manner in which its pivoted end is attached to the post 31, this downward swinging will be limited as shown in Fig. 5 by the engagement of the under edge of the arm with the portion of the post 31 lying between the ears 36, as will be readily obvious.

The foot lever 35 is in the form of an arcuate or substantially semi-circular bar to the convex side or edge of which the upper end of the crank arm 34 is rigidly secured, approximately midway between the ends of the lever 35. Also the crank arm is set to extend somewhat obliquely to a radial line passing from the center of the curvature of the foot lever through the location at which it is attached to the foot lever. Thus as is shown in Fig. 4, when the foot lever is in the raised position where the brakes are released, the crank arm will be disposed at a slight downward and forward inclination with respect to the vertical line of the post 31 to which it is attached.

The ends of the substantially semi-circular foot lever have forward and rear end portions provided with laterally extending forward and rear pedals 39 and 40 respectively.

The flattened rear end portions 26' of the short links 26 are disposed on opposite sides of the foot lever at the position where the upper end of the crank arm is attached and extending transversely through the foot lever is a pivoted bolt or pin 41 which also passes through the rear ends of the short links 26 of the toggles. The connection of the links 26 with the bolt 41 is such that when the crank arm is swung downwardly to the over-center position in which it is shown in Fig. 5, the links 26 may pass the pivot 37 so as to come to a final position below this center.

While the pivot bolt 41 has been shown as passing through the foot lever 35 it may, of course, be mounted in the upper end of the crank arm 34, if desired.

Each of the long links 25 of the toggles has pivotally attached thereto at a point adjacent to the forward end or pivot 29, as indicated at 42, the forwardly extending, obliquely disposed toggle rod 43. The rear ends of these rods extend across the adjacent side rails 12 toward the rear wheels. Each of the toggle rods is pivotally secured at its rear end, as at 44, to and intermediate the ends of a brake arm 45. Each of these brake arms is pivotally secured at 46 to the adjacent frame rail 12 at a position close to the forward side of the adjacent rear wheel 23 and the other end of such arm 45 is formed to provide the rear wheel engaging brake shoe 47 which extends across and is spaced slightly from the tread of the adjacent rear wheel when the brakes are unapplied.

As will be readily seen upon reference to Fig. 1, when the brakes are unapplied the two rearwardly converging toggles 24 are broken inwardly or toward one another so that the long and short links are out of alignment. When the foot lever is depressed by applying a downward force against the pedal 40, the lever and the crank arm will swing rearwardly and downwardly from the position shown in Fig. 4 to the position shown in Fig. 5. This will, of course, apply a rearward pull upon the short links 26 which will tend to straighten out the two toggles, pivoting the long links 25 at 29 to swing the brake shoes 28 forwardly against the rear sides of the front wheels 22. At the same time, due to the slight outward swinging of each long link 25, an outward and rearward thrust will be applied to the toggle rod 43 attached thereto which will force the rear brake arms 45 in a rearward direction to apply the shoes 47 to the treads of the rear wheels. When the crank 38 has swung down beyond the pivot 37 or over-center, the short links 26 will be slightly below the pivot 37 and since the further downward swinging of the crank arm is limited by its engagement with the bottom of the furcation, in which it is pivotally mounted, the brakes will be maintained in locked position.

Reverse swinging of the foot lever 35 to release the brakes is effected by applying thrust with the foot to the pedal 39 so as to force it forwardly in a manner which will be readily obvious.

From the foregoing, it will be seen that there is provided by the present invention a relatively simple 4-wheel brake mechanism which will positively lock in brake-applied condition when the foot lever is actuated for the purpose of applying the brakes and which will hold its position without employing the action of springs or resilient tensioning bars as in prior known structures.

I claim:

1. In a wheeled vehicle, a pair of frame side rail members, front and rear wheel supporting axles extending thereacross and secured thereto, and brake mechanism comprising a pair of toggles each embodying a long link having a front pivot connection adjacent to one end with a side rail member adjacent to the rear side of a front wheel and a short link pivotally attached at one end to the other end of the long link, each of said long links having an oblique outwardly extending brake arm terminating in a brake shoe, a pivot member coupling each long link to a side member of the frame at the angle of the long link and brake arm, said brake arm being disposed to position the shoe across the rear side of a front wheel, said toggles extending rearwardly in a convergent relation, a vertical post secured rigidly upon the rear axle on the longitudinal center of the frame, a foot lever comprising an elongate member pivotally connected intermediate its ends to the top end of the post to swing on said center, said elongate member being formed with end portions so related to the said pivotal connection of the elongate member as to be elevated above said pivotal connection when the mechanism is in brake released position, a pivotal connection between the other ends of said short links and said foot lever whereby the toggles will be substantially straightened upon the swinging of said foot lever rearwardly and downwardly from said brake released position to brake applied position, a brake arm carrying a brake shoe and pivotally mounted on each side rail of the frame adjacent to the front side of the adjacent rear wheel and having the brake shoe disposed across the tread of the adjacent wheel, and a pair of toggle rods each having an end pivotally connected to a long toggle link at a point forwardly of the pivot mounting of an adjacent brake arm and extending outwardly and rearwardly toward and pivotally connected at its other end to the said adjacent brake arm at a point between the pivotal mounting for the latter and the brake shoe carried thereby, said end portions of the foot lever being swung in the actuation of the mechanism to apply the brakes from a position in which they are substantially horizontally aligned on said longitudinal center to a position in which they are substantially vertically aligned, one of said portions being adapted to receive thrust to apply the brakes and the other portion being adapted to receive thrust to release the brakes.

2. In a wheeled vehicle, a pair of frame side rail members, front and rear wheel supporting axles extending thereacross and secured thereto, and brake mechanism comprising a pair of toggles each embodying a long link having a front pivot connection adjacent to one end with a side rail member adjacent to the rear side of a front wheel and a short link pivotally attached at one end to the other end of the long link, said toggles extending rearwardly in convergent relation from the front pivot connections of the long links, a brake shoe member rigidly fixed to said one end of each long link and disposed across the tread of and on the rear side of the adjacent front wheel, said toggles being broken inwardly toward one another at the pivots between the links when the mechanism is in brake released position, a support means, a foot lever characterized by an elongate part having forward and rear end portions and a rigid arm fixed at one end to and intermediate the end portions of the elongate part to extend substantially perpendicularly thereto, means pivotally attaching the other end of said rigid arm to said support means for turning in a direction to swing said elongate part in a vertical plane extending longitudinally of the frame, and pivot couplings between the other ends of said short links and the foot lever adjacent to the said one end of the rigid arm whereby oscillation of the foot lever in one direction on the pivot for the rigid arm and beyond a predetermined position by application of pressure to said rear end portion substantially straightens the toggles to oscillate the links in a direction to apply the brake mechanism and effects locking of the brakes, the said forward and rear end portions of said elongate part being approximately in a horizontal line in the released position of the brake mechanism and in approximately a vertical line in the applied position of the brake mechanism whereby in the latter position said forward end portion is uppermost and adapted to receive pressure for effecting release of the brake mechanism.

3. The invention according to claim 2, wherein the said elongate part of the foot lever is substantially of U form and wherein each of the said end portions carries a laterally extending element, said laterally extending elements forming foot pedals.

4. The invention according to claim 2, with a pair of toggle rods each pivotally connected at one end to a long toggle link at a point on the latter forwardly of the rear wheels and extending laterally and rearwardly across the adjacent side rail, a brake shoe arm pivotally connected to each side member of the frame and having a brake shoe portion in opposed relation to the tread of an adjacent rear wheel at the forward side of said rear wheel, and a pivot coupling between the other end of each toggle rod and an adjacent brake shoe arm.

References Cited in the file of this patent

UNITED STATES PATENTS

| | | |
|---|---|---|
| 402,361 | Snedekor | Apr. 30, 1889 |
| 473,606 | Bassett | Apr. 26, 1892 |
| 608,865 | Jones | Aug. 9, 1898 |
| 1,331,513 | Lindberg | Feb. 24, 1920 |
| 1,507,955 | Dann et al. | Sept. 9, 1924 |
| 2,591,524 | Douglas | Apr. 1, 1952 |

FOREIGN PATENTS

| | | |
|---|---|---|
| 964,745 | France | Feb. 1, 1950 |
| 376,845 | Great Britain | July 21, 1932 |